(12) United States Patent  
Ramalingam et al.

(10) Patent No.: US 10,014,124 B1
(45) Date of Patent: Jul. 3, 2018

(54) COMPOSITE ELECTRODE MATERIAL FOR SUPERCAPACITORS

(71) Applicant: KING SAUD UNIVERSITY, Riyadh (SA)

(72) Inventors: Rajabathar Jothi Ramalingam, Riyadh (SA); Hamad Abdullah Al-Lohedan, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/717,646

(22) Filed: Sep. 27, 2017

(51) Int. Cl.
    *H01G 11/36* (2013.01)
    *H01G 11/86* (2013.01)

(52) U.S. Cl.
    CPC ............. *H01G 11/36* (2013.01); *H01G 11/86* (2013.01)

(58) Field of Classification Search
    None
    See application file for complete search history.

(56) References Cited

U.S. PATENT DOCUMENTS

| | | | | |
|---|---|---|---|---|
| 2011/0038100 A1* | 2/2011 | Lu | .......................... | H01G 11/36 361/502 |
| 2012/0026644 A1* | 2/2012 | Dunn | ..................... | H01G 11/46 361/502 |
| 2013/0161570 A1 | 6/2013 | Hwang et al. | | |
| 2014/0212672 A1 | 7/2014 | Han et al. | | |
| 2017/0148573 A1* | 5/2017 | Zhamu | ................... | H01G 11/02 |

FOREIGN PATENT DOCUMENTS

| | | |
|---|---|---|
| CN | 102324318 | 1/2012 |
| CN | 103013056 | 4/2013 |
| CN | 103641174 | 3/2014 |
| CN | 104599857 | 5/2015 |
| CN | 105826083 | 8/2016 |
| CN | 106098410 | 11/2016 |

OTHER PUBLICATIONS

Chen et al., "Graphene Oxide-MnO2 Nanocomposites for Supercapacitors", ACS Nano (2010), 4(5), pp. 2822-2830 (Abstract only).

* cited by examiner

*Primary Examiner* — Katie L Hammer
(74) *Attorney, Agent, or Firm* — Richard C. Litman

(57) ABSTRACT

The composite electrode material for supercapacitors includes mesoporous manganese dioxide (MnO2), graphene oxide, and nanoparticles of molybdenum disulfide ($MoS_2$). The composite material is prepared by preparing mesoporous manganese dioxide, preferably by surfactant-assisted precipitation, then mixing graphene oxide with the mesoporous $MnO_2$ is ethanol and ultrasonicating, and finally nanoparticles of $MoS_2$ are mixed with the suspension of graphene oxide and mesoporous $MnO_2$ to form the composite electrode material. The capacitance of the material may be varied by changing the concentration of $MoS_2$ nanoparticles. Samples of the composite electrode material exhibited good supercapacitance values, such as 527 and 1160 F/g.

1 Claim, 6 Drawing Sheets

US 10,014,124 B1

COMPOSITE ELECTRODE MATERIAL FOR SUPERCAPACITORS

BACKGROUND OF THE INVENTION

1. Field of the Invention

The disclosure of the present patent application relates to the manufacture of supercapacitors, and particularly to a composite electrode material for supercapacitors.

2. Description of the Related Art

Pseudo-capacitor-based oxide materials are commonly used with nanocarbon materials to provide the advantages of conductive and pseudo-capacitor properties. In particular, adding pseudo-capacitor materials, such as $RuO_2$, $IrO_2$, NiO, $Co_3O_4$, and various conducting polymers to the surface of a conductive material enhances electrochemical performance by altering the redox properties.

Compared with other well-known pseudo-capacitor materials, manganese oxide is a highly promising electrode material for use in pseudo-capacitors because of its low cost, high theoretical specific capacitance ($\sim$1100 F $g^{-1}$), and lower degree of environmental toxicity. The multiple valence states of manganese (Mn) ions provide a wide range of electrochemical applications. One of the most practical approaches to improve the use of manganese oxide involves utilizing large surface area nanocarbon-based materials, such as single/multi-walled carbon nanotubes and graphene, as the support for manganese oxide, thereby increasing its electrochemical activity. Graphene and reduced graphene oxides exhibit effective chemical stability, high electrical conductivity, and excellent mechanical properties that are at least comparable to, if not better than, those exhibited by carbon nanotubes.

Improving the surface area and conductive supports improves the electrical conductivity of $MnO_2$-based electrodes, and also increases their surface activity, further promoting electron transfer in the manganese oxide lattice. The orderly-arranged and tightly-anchored nano-sized manganese oxide particles on graphene have also demonstrated improved specific capacitance (up to 365 F/g) and continuous cycle stability.

The manganese oxide particles attached to the graphene contribute to the relatively high porosity and enhanced capacitance. Interestingly, the power and energy densities of graphene-based devices depend in part on the degree of oxidation of the graphene, which is much higher than $MnO_2$ nanorod/graphene composites. The specific capacitance increases due to the large amount of $MnO_2$, and the large specific area provided by the $MnO_2$ nanosheet/graphene composites.

To further improve the capacitive performance of supercapacitors, some investigators have focused on increasing their conductivity and capacitance by incorporating or depositing a metal nanoparticle. The hierarchical Ni nanoparticle on $MnO_2$-based supercapacitors with various mass loadings of $MnO_2$ yielded high specific capacitances of 370~1121 F/g in aqueous $Na_2SO_4$ electrolyte. This improved performance is attributable to the formation of electron pathways for the rapid charge-discharge reaction in the presence of highly conductive hollow Ni dendrites.

Graphene, like other two-dimensional nanosheets, such as layered metal dichalcogenides (LMDs), has also been extensively studied. $MoS_2$ has a layered structure consisting of three covalently bonded atomic sandwich layers of S—Mo—S.

Thus, a composite electrode material for supercapacitors solving the aforementioned problems is desired.

SUMMARY OF THE INVENTION

The composite electrode material for supercapacitors includes mesoporous manganese dioxide (MnO2), graphene oxide, and nanoparticles of molybdenum disulfide ($MoS_2$). The composite material is prepared by preparing mesoporous manganese dioxide, preferably by surfactant-assisted precipitation, then mixing graphene oxide with the mesoporous $MnO_2$ is ethanol and ultrasonicating, and finally nanoparticles of $MoS_2$ are mixed with the suspension of graphene oxide and mesoporous $MnO_2$ to form the composite electrode material. The capacitance of the material may be varied by changing the concentration of $MoS_2$ nanoparticles. Samples of the composite electrode material exhibited good supercapacitance values, such as 527 and 1160 F/g.

These and other features of the composite electrode material for supercapacitors will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
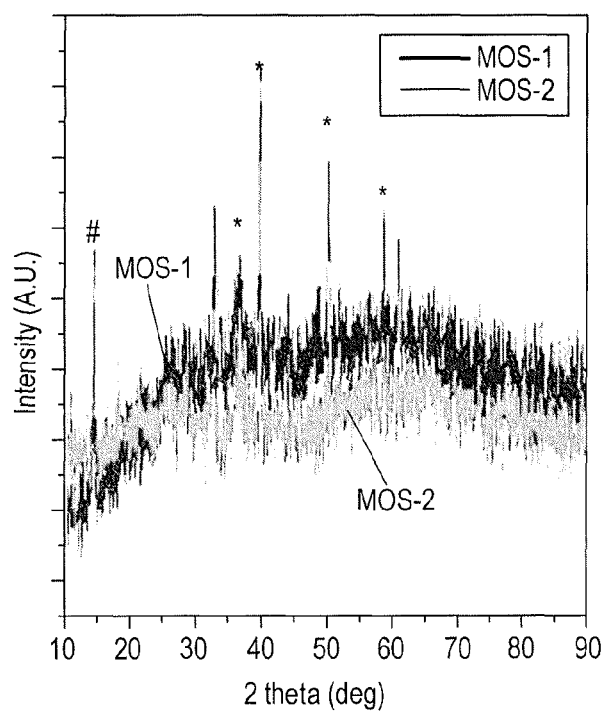
FIG. 1A is comparative X-ray diffraction patterns for MOS-1 ($MoS_2$/GO/meso-$MnO_2$) and MOS-2 ($MoS_2$/GO/meso-$MnO_2$) composite electrode materials.

The composite electrode material for supercapacitors includes mesoporous manganese dioxide (MnO2), graphene oxide, and nanoparticles of molybdenum disulfide ($MoS_2$).

The composite material is prepared by preparing mesoporous manganese dioxide, preferably by surfactant-assisted precipitation, then mixing graphene oxide with the mesoporous $MnO_2$ is ethanol and ultrasonicating, and finally nanoparticles of $MoS_2$ are mixed with the suspension of graphene oxide and mesoporous $MnO_2$ to form the composite electrode material. The capacitance of the material may be varied by changing the concentration of $MoS_2$ nanoparticles. Samples of the composite electrode material exhibited good supercapacitance values, such as 527 and 1160 F/g.

The composite electrode material provides non-toxic nanocomposites that function as highly active supercapacitor materials. Manganese dioxide is particularly useful as a potential electrode material for supercapacitor application because of its massive theoretical specific capacitance value (1100 F/g).

Preferably, mesoporous manganese dioxide is prepared by non-ionic, surfactant-assisted precipitation method. Precipitation is carried out using $MnSO_4$, TritonX-100 as a non-ionic surfactant, ammonium persulphate ($NH_4S_2O_8$) as the oxidizing agent, and ammonia as directing agent. Triton X-100 (2 mL) is dissolved in a minimum amount of deionized water (240 mL) and stirred continuously for 60 min, followed by the addition of 0.1 M $MnSO_4$ dissolved in 50 mL of deionized water. Then, 0.1 M $NH_4S_2O_8$ is added to the $MnSO_4$ solution, and stirred vigorously for 60 minutes. After mixing, ammonia solution is added dropwise and stirred vigorously until precipitation is complete. After 12 hours of continuous stirring, the solution is filtered and dried at 120° C. to remove volatile impurities. The dried meso-$MnO_2$ is calcined at 400° C. for 3 hours to complete removal of the surfactant. The resulting product, mesoporous $MnO_2$ is used as a support for preparing the composite.

To prepare the composite electrode material, 0.5 g of graphene oxide (GO) is mixed with mesoporous manganese dioxide in ethanol solution. The mixture was subjected to ultrasonic irradiation for 15 minutes with 20% amplitude power to reduce the GO. Then, two different samples of the composite material were prepared by mixing 0.1 g and 0.05 g $MoS_2$ nanoparticles, respectively, with the above-prepared suspension of GO and $MnO_2$ to obtain two samples of composite electrode materials, designated MoSGMn-1 and MoSGMn-2.

The prepared nanocomposites are dried gently in a hot air oven and are used to prepare the modified electrode materials using nafion substrate for supercapacitor activity evaluation. Good supercapacitance values, such as 527 and 1160 F/g, were achieved for these newly developed $MoS_2$ nanoparticle/graphene oxide deposited mesoporous manganese oxide nanocomposites.

The samples of composite electrode material were characterized and evaluated as follows. For X-ray diffraction studies, the major intense peaks are indexed and referenced with standard powder diffraction data. The prepared mesoporous $MnO_2$ matched well with JCPDS file number 24-0508 for the $Mn_2O_3$ phase of manganese oxide, while the d-spacing values and crystalline hkl values are similar to reported literature values of meso-$MnO_2$ prepared by other synthesis methods.

Figure 1B:
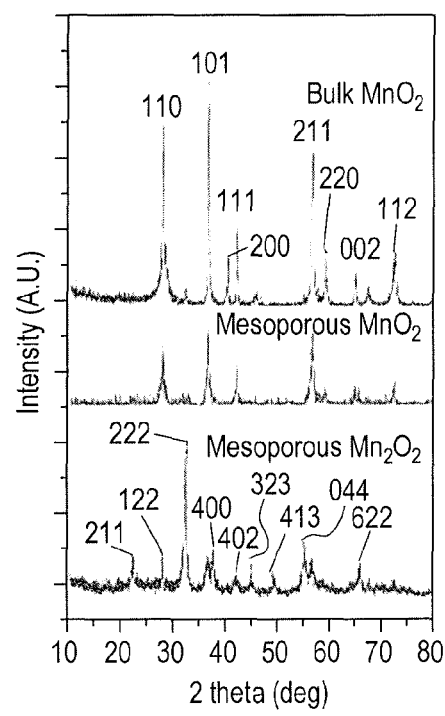
FIG. 1B is comparative X-ray diffraction patterns for bulk $MnO_2$, meso-$MnO_2$, and meso-$Mn_2O_3$.
Figure 2A:
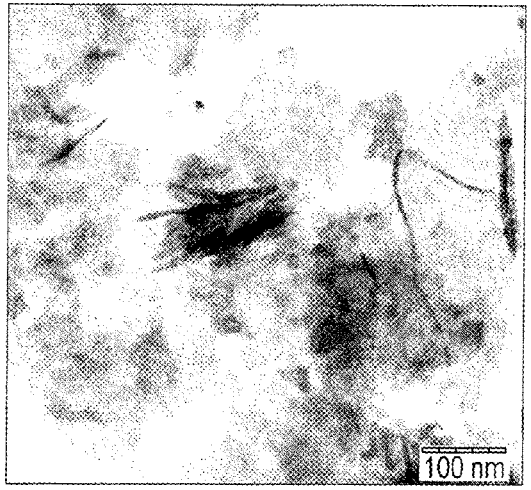
FIGS. 2A, 2B, 2C and 2D are TEM micrographs of $MoS_2$/GO/meso-$MnO_2$ composite materials at different magnifications.
Figure 2B:
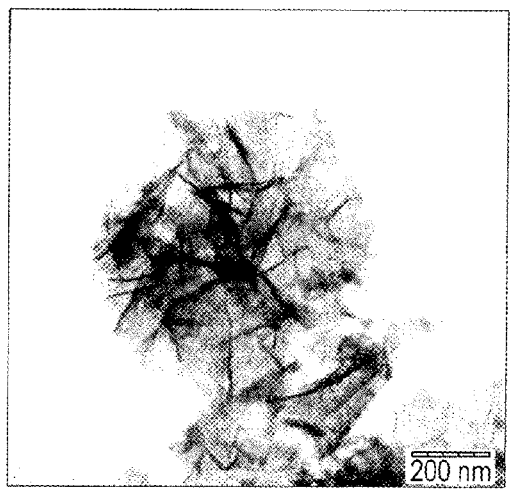
Figure 2C:
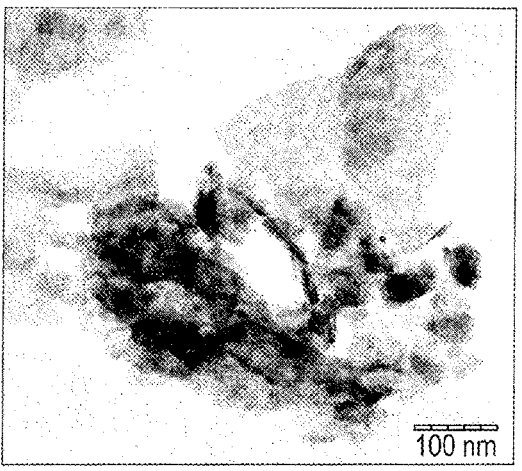
Figure 2D:
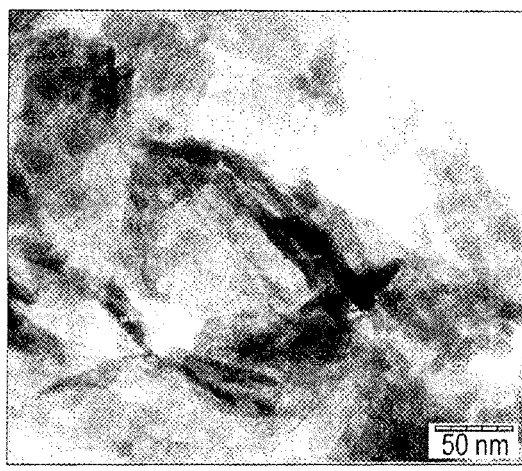

FIG. 1A shows the XRD patterns for MoSGMn-1 and MoSGMn-2. FIG. 1B shows the XRD patterns for bulk $MnO_2$, meso-$MnO_2$, and meso-$Mn_2O_3$. The prepared porous $MnO_2$ based nanocomposite materials match XRD phases of reported commercially prepared porous manganese oxide.

FIGS. 2A, 2B, 2C, and 2D are a series of Transmission Electron Micrograph (TEM) images of MOSGMn-1, at different magnifications. The reduced graphene oxide and $MoS_2$ exist in the form of glassy flaky morphology in the final nanocomposite. In some places, the tubular structure of manganese oxide aggregated with reduced graphene oxide can be seen, forming the flower shape morphology.

Electrochemical measurements were carried using a PARSTAT 4000 electrochemical impedance analyzer in three electrode system. Ag/AgCl and platinum wire were used as the reference electrode and counter electrode respectively. The working electrode was $MoS_2$/graphene/meso-$MnO_2$ nanocomposite powder coated over nickel foam as substrate material. The nickel foam is 6 cm in length, and 1 cm in width 1 cm, while the area of loading active materials is 1 $cm^2$ (1 cm×1 cm). The working electrodes were prepared by mixing $MoS_2$/graphene/meso-$MnO_2$ nanocomposite powder at 95 weight % with nafion at 5 weight %, to form a paste, followed by drying at 80° C. in an oven for 2 hours. The mass of the electrode material was found to be approximately 5 mg. The electrolyte was a mixture of 1M $H_2SO_4$ with 0.5 M KI.

The Nafion perfluorinated resin solution used for working electrode preparation was obtained from Sigma-Aldrich. All the reagents used in the process were of analytical grades. The nickel foam (width: 5 cm, pore number: 110 PPI, Thickness: 1.5±0.5 mm, Density: 480±30 $g/m^2$) used as substrate for coating porous carbon was obtained from Winfay Group Company Limited, Shanghai, China.

Figure 3A:
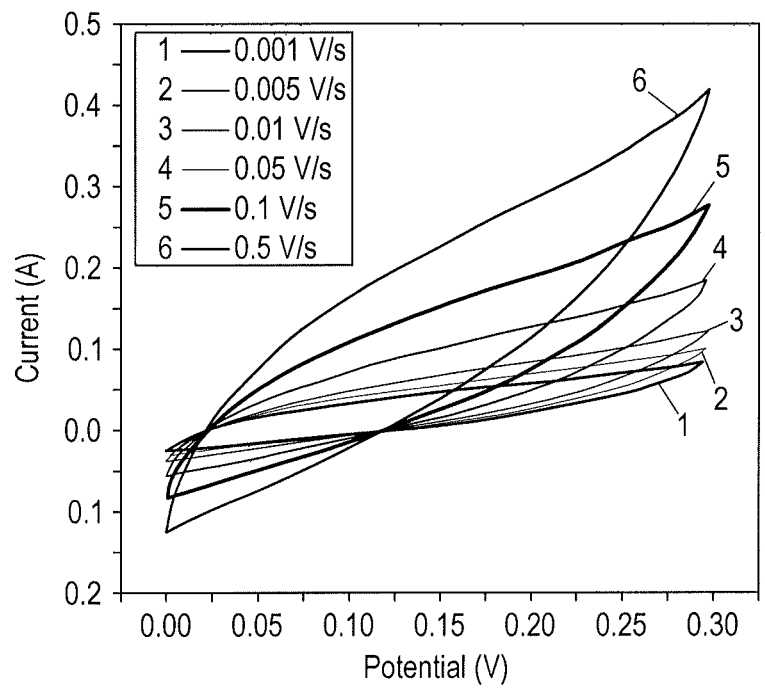
FIG. 3A is a cyclic voltammetry plot, comparing curves for a MoSGMn-1 composite electrode at different scan rates.
Figure 4A:
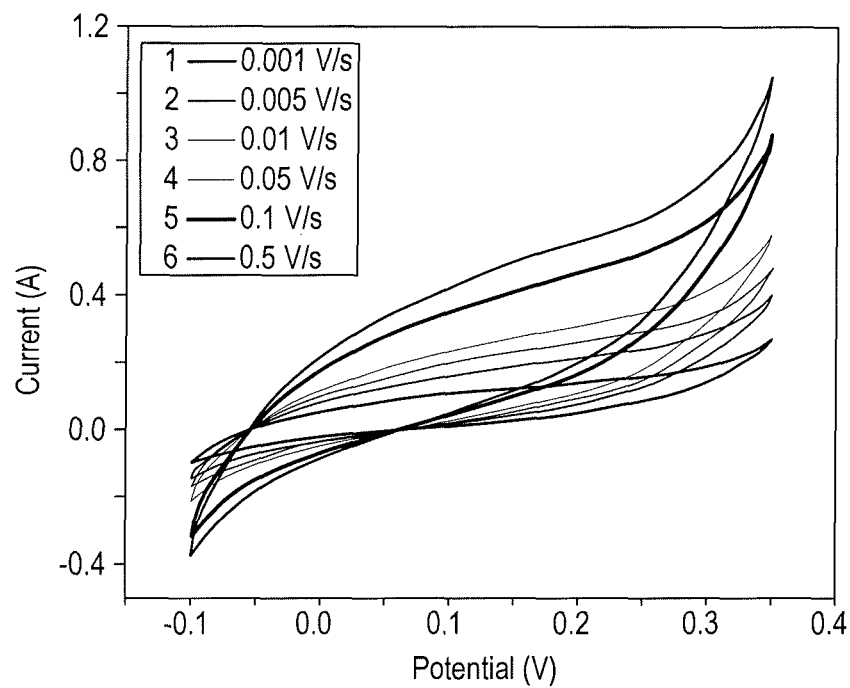
FIG. 4A is a cyclic voltammetry plot, comparing curves for a MoSGMn-2 composite electrode at different scan rates.

FIGS. 3A and 4A show electrochemical characteristics of the synthesized composite electrode material samples using cyclic voltammetry (CV) at different scan rates ranging from 1-500 mV/s, in 1M $H_2SO_4$ with 0.5 M KI as the electrolyte medium. In all the scan rates, the CV curves showed leaf-like structures without any redox peaks, indicating that the electrode material possess good electrical double-layer capacitance.

The specific capacitance of the electrode materials is calculated using the following equation:

$$C_{sp} = \frac{1}{vm(V - V_0)} \int_{V_0}^{V} I(V) dV, \qquad (1)$$

where $C_{sp}$ is the specific capacitance (F/g), 1 is a current response in accordance with the sweep voltage (A), v is the potential scan rate (V/s), $V-V_0$ is the potential window (V) and m is the mass of the electrode in grams. See Table 1, below.

TABLE 1

| Specific Capacitance (F/g) from CV studies at different scan rates | | |
|---|---|---|
| Scan rate (V/s) | Specific Capacitance (F/g) | |
| Sample Code | MoSGMn-1 | MoSGMn-2 |
| 0.001 V/s | 527 | 1160 |
| 0.005 V/s | 134 | 520 |
| 0.01 V/s | 76 | 208 |
| 0.05 V/s | 27 | 91 |
| 0.1 V/s | 17 | 50 |
| 0.5 V/s | 5 | 37 |

As reflected in Table 1, the specific capacitance results for MoSGMn-1 and MoSGMn-2 at 1 mV/s (0.001 V/s) are 527 F/g and 1160 F/g, respectively.

The higher specific capacitance for MoSGMn-2 may be due to one or more of the following. From the morphological studies, nanoneedle-like structures of the electrode material offer considerably shorter ion diffusion channels during the charging/discharging process. The interconnected structure of the conducting graphene sheets will improve the electron transport over the less conducting $MoS_2$. Lastly, specific surface area provided by mesoporous $MnO_2$ will be higher in the case of MoSGMn-2 samples. Specific capacitance is decreased with increase in the scan rate in both samples. At low scan rates, ions will get enough time to diffuse into the inner pores of the electrodes. Consequently, more ions are adsorbed on the electrode surface, leading to better capacitive behavior.

Figure 3B:
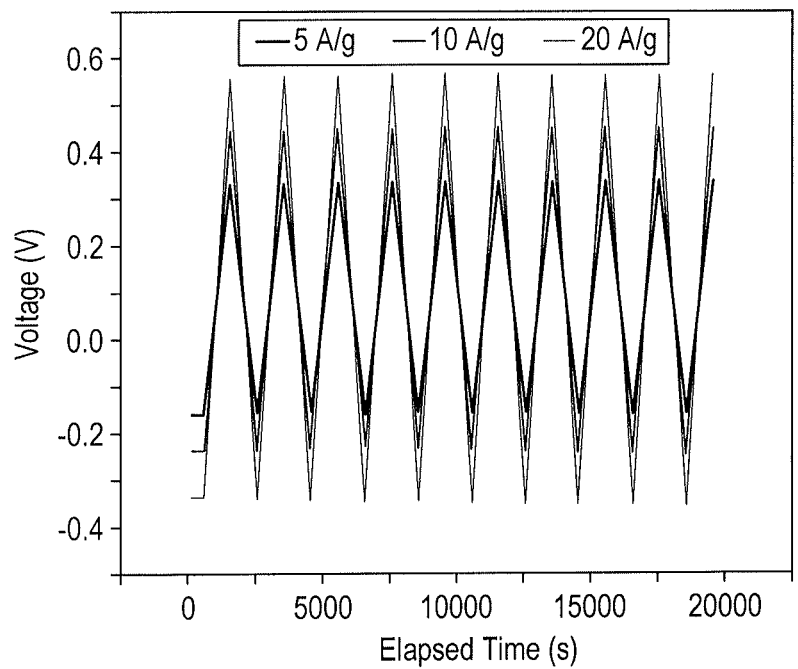
FIG. 3B is a galvanostatic charge-discharge plot, comparing curves for a MoSGMn-1 composite electrode at different current densities.
Figure 4B:
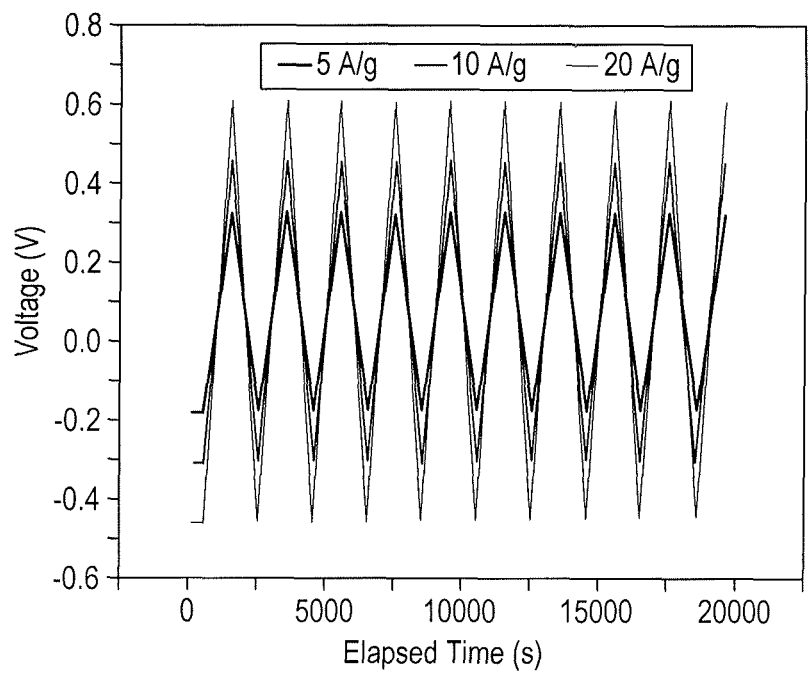
FIG. 4B is a galvanostatic charge-discharge plot, comparing curves for a MoSGMn-2 composite electrode at different current densities.

FIGS. 3B and 4B show galvanostatic charge-discharge (GCD) measurements at 5, 10 and 20 A/g to verify the supercapacitive performance of the composite materials. In the GCD studies, symmetrical triangular curves indicate excellent capacitance behaviors, good electro-chemical stability and improved cycle life. From FIGS. 3B and 4B, it is clear that both electrodes show excellent charge/discharge properties, similar to an ideal electric double layer capacitor.

Figure 5:
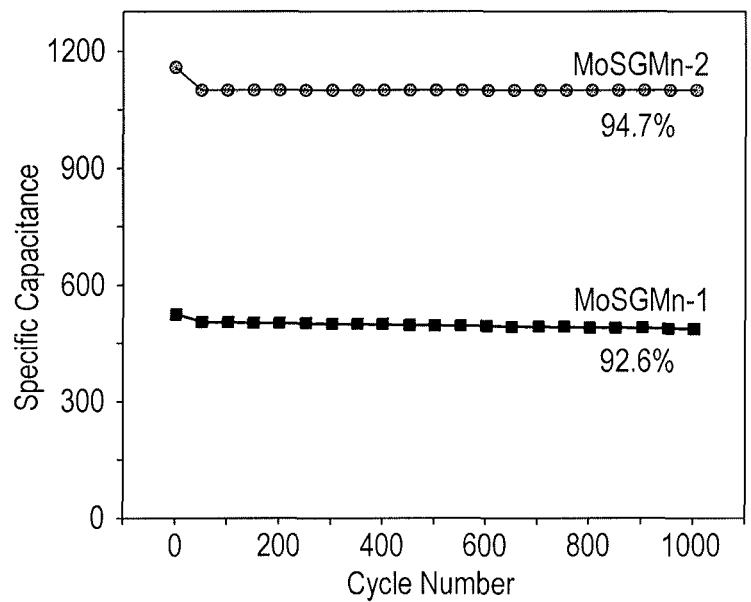
FIG. 5 is a plot of Specific Capacitance vs. Cycle Number for MoSGMn-1 and MoSGMn-2 composite electrode material.
Figure 6:
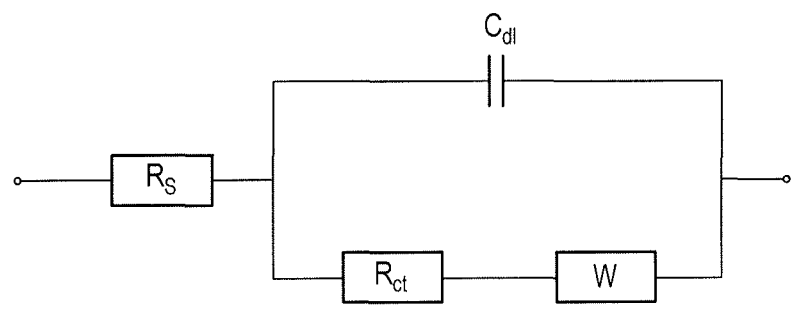
FIG. 6 is a schematic diagram of an equivalent circuit used to evaluate charge transfer mechanism impedance spectra.

Cyclic stability is another major factor defining the performance of a supercapacitor. Here, for example, both the electrodes exhibited cyclic stability at least through 1000 cycles. As shown in FIG. 5, specific capacitance values for MoSGMn-1 electrode and MoSGMn-2 electrodes remain at 92.6% and 94.7% of the initial value, respectively, even after 1000 cycles.

Figure 3C:
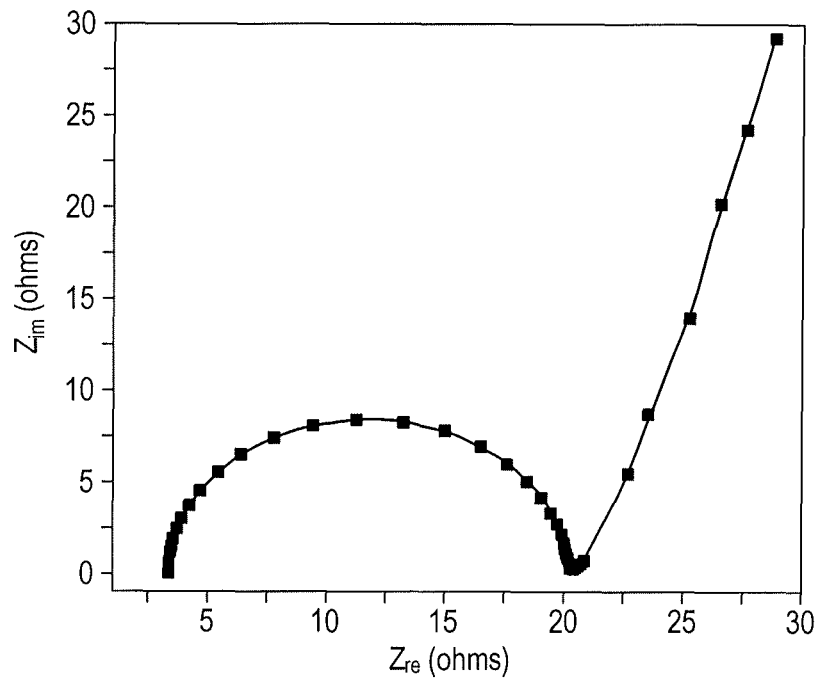
FIG. 3C is a Nyquist plot for MoSGMn-1 within the frequency range of 10 mHz to 1 kHz at an AC voltage of 5 mV.
Figure 4C:
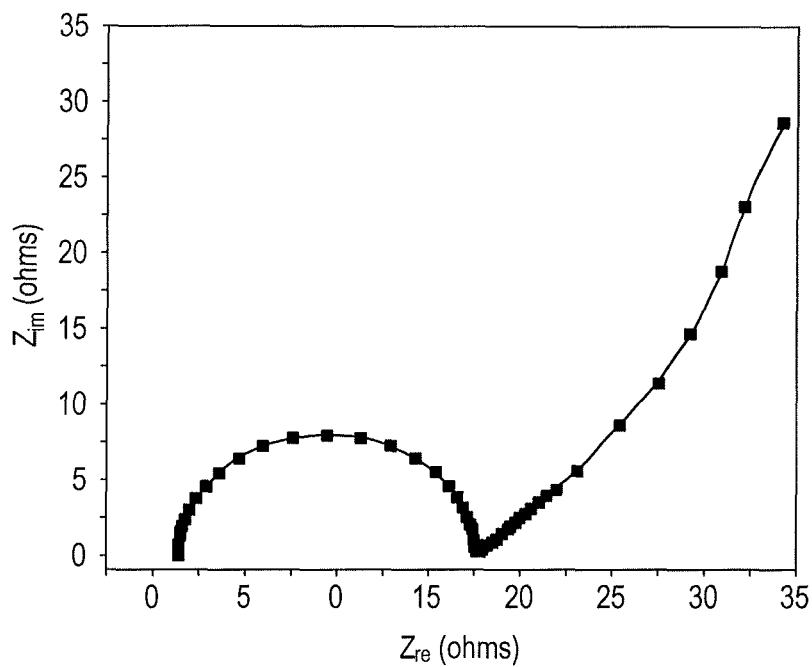
FIG. 4C is a Nyquist plot for MoSGMn-2 within the frequency range of 10 mHz to 1 kHz at an AC voltage of 5 mV.

FIGS. 3C and 4C show electrochemical impedance spectroscopy (EIS) results in the frequency range of 10 mHz to 1 KHz at an AC voltage of 5 mV. There are three main regions in the Nyquist plots of the composite electrodes. First, a large semicircle in the high frequency region defines the electronic resistance of electrode materials including the solution resistance and charge transfer resistance. The difference between solution resistance and charge transfer resistance yields equivalent resistance of the electrode material. The slope of the line creates an angle with the semicircle in the middle frequency region in the Nyquist plot. This region provides information about the diffusion of electrolyte ions in the pores of the electrode. And the linear line at the low frequency region depicts the capacitive behavior of the composite electrode material.

Additional evaluation was performed by determining impedance spectroscopy equivalent circuit parameters, using the equivalent circuit in FIG. 5. The results are reported in Table 2, below.

TABLE 2

Impedance Spectroscopy equivalent circuit parameters

| Sample | $R_s$ (Ω) | $R_{ct}$ (Ω) | ESR (Ω) | W (Ω) | Knee frequency $f_k$ (Hz) |
|---|---|---|---|---|---|
| MoSGMn-1 | 3.28 | 20.82 | 17.53 | 8.15 | 79.43 |
| MoSGMn-2 | 1.40 | 16.08 | 14.67 | 5.65 | 109.91 |

In Table 2, $R_s$ is the solution resistance, which contains both ohmic resistance of the electrolyte and the internal resistance of the electrode materials. Here, MoSGMn-1 and MoSGMn-2 electrodes have $R_s$ values of 3.28Ω and 1.48Ω, respectively, due to resistance of the $H_2SO_4$—KI electrolyte medium. Lower values of charge transfer resistance ($R_{ct}$) correlate with better charge/discharge performance and good capacitance. The results obtained here are consistent with the good specific capacitance in cyclic voltammetry studies mentioned above.

The small contribution of Warburg impedance (W) indicates superior diffusion of electrolyte ions into the porous network of the electrode materials. Knee frequency, also reported in Table 2, is the maximum frequency at which capacitive behaviors of an electrode material are dominant. Due to a low ESR value, MoSGMn-2 exhibits higher knee frequency of 109.91 Hz compared to 79.43 Hz for MoSGMn-1.

These electrochemical studies confirm that the composite materials are excellent electrode materials for high performance supercapacitor device fabrication.

It is to be understood that the composite electrode material for supercapacitors is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed composite electrode material for supercapacitors.

We claim:

1. A method of making a composite electrode material for supercapacitors, comprising the steps of:
   preparing mesoporous manganese dioxide by non-ionic surfactant-assisted precipitation, wherein the non-ionic surfactant assisted precipitation includes the steps of:
      dissolving and stirring octylphenol ethoxylate in deionized water to form dissolved octylphenol ethoxylate;
      dissolving $MnSO_4$ in deionized water to form a dissolved $MnSO_4$;
      adding the dissolved $MnSO_4$ to the dissolved octylphenol ethoxylate to form a first solution;
      stirring ammonium persulphate ($NH_4S_2O_8$) into the first solution to form a second solution; and
      adding ammonia solution, dropwise, to the second solution to form a final solution, then stirring the final solution until precipitation is complete;
   adding reduced graphene oxide to the mesoporous manganese dioxide in ethanol solvent to form a suspension
   ultrasonicating the suspension to ensure mixing the reduced graphene oxide with the mesoporous manganese dioxide;
   mixing molybdenum disulfide nanoparticles into the suspension to form a mixture; and
   drying the mixture to obtain the composite electrode material.

* * * * *